W. H. FROST & J. J. NIX.
PROCESS FOR THE PRODUCTION OF CARBON BLACK TOGETHER WITH COMBUSTIBLE GAS.
APPLICATION FILED MAR. 24, 1909.
977,000.
Patented Nov. 29, 1910
2 SHEETS—SHEET 1.
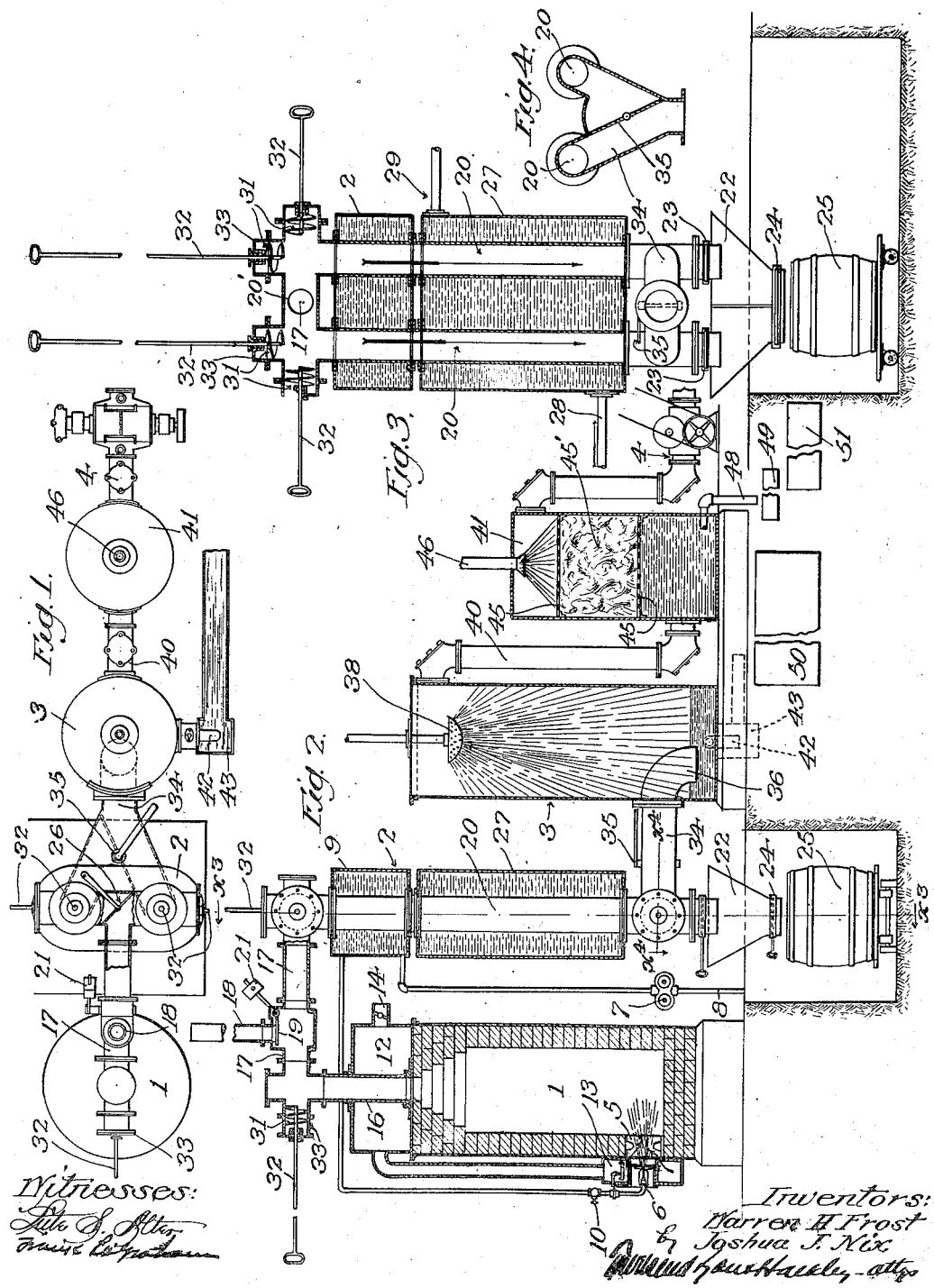

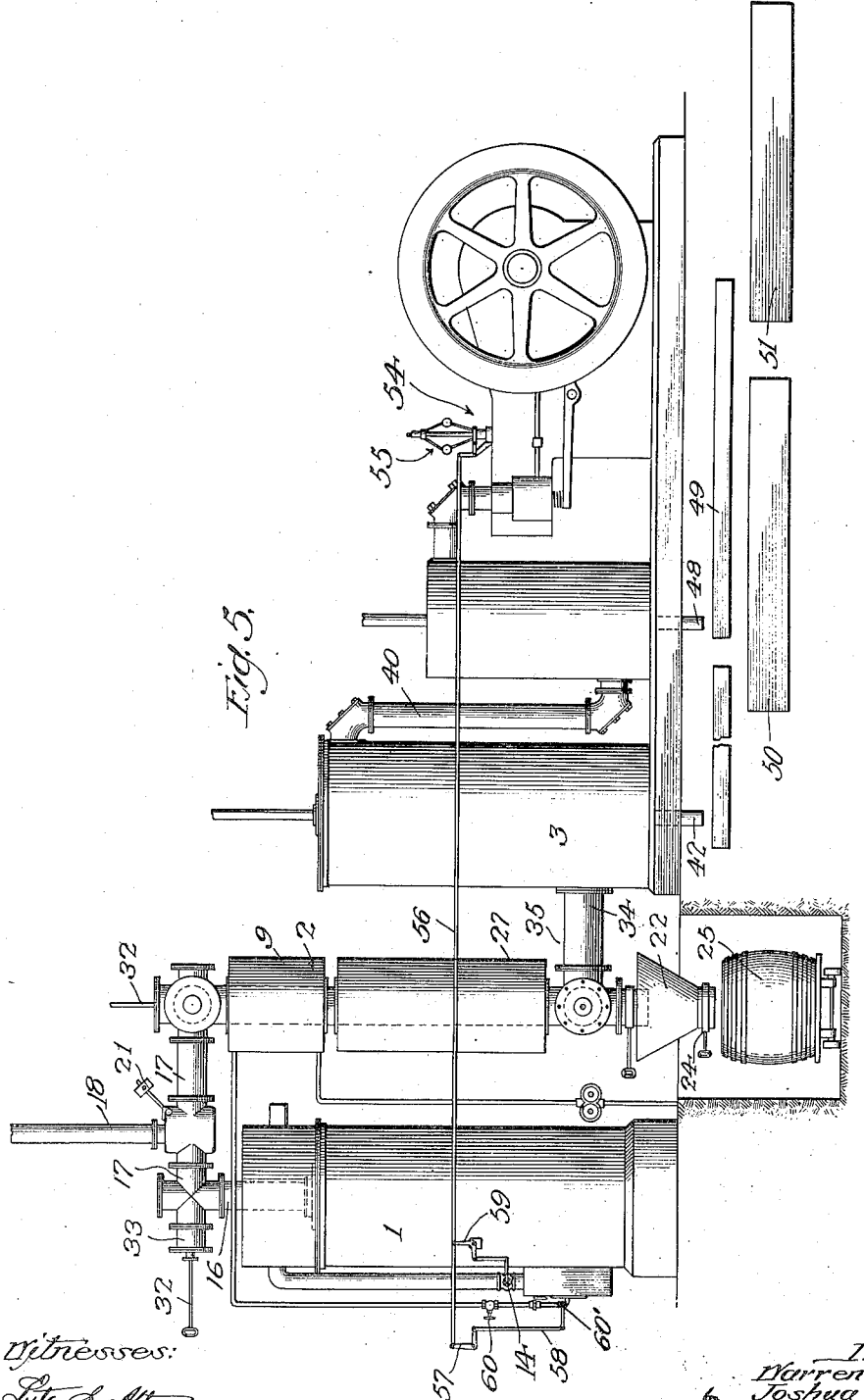

UNITED STATES PATENT OFFICE.

WARREN H. FROST AND JOSHUA J. NIX, OF LOS ANGELES, CALIFORNIA; SAID NIX ASSIGNOR TO SAID FROST.

PROCESS FOR THE PRODUCTION OF CARBON-BLACK TOGETHER WITH COMBUSTIBLE GAS.

977,000. Specification of Letters Patent. Patented Nov. 29, 1910.

Application filed March 24, 1909. Serial No. 485,534.

*To all whom it may concern:*

Be it known that we, WARREN H. FROST and JOSHUA J. NIX, citizens of the United States of America, both residing at Los Angeles, in the county of Los Angeles and State of California, have invented a new and useful Process for the Production of Carbon-Black Together with Combustible Gas, of which the following is a specification.

The main object of the present invention is to provide in a single process for the efficient and economical production from petroleum of carbon black together with combustible gas.

Other objects of the invention will appear hereinafter.

The petroleum or oil used in the present process is preferably crude oil, for example, California crude oil or the like.

In the process forming the subject of the present invention oil is subjected to heat in a closed chamber, the heat being produced by combustion of a portion of the oil within the chamber, such combustion being supported by admission or supply of a limited quantity of atmospheric air, and the products of combustion are drawn away from said chamber at such a rate that a condition of partial vacuum or suction is maintained within the chamber and the said particles of combustion are prevented from smothering or deadening the flame. We have found it possible by this means to maintain continuous combustion and generation of gas, in a manner that is not possible when the oil and the air for supporting combustion are forced into the chamber when the latter is under a condition of pressure. In this connection the present invention provides for application of the oil with a minimum of expansive medium, thereby correspondingly increasing the volume of expansive fluid which has to be withdrawn from the chamber to maintain the condition of suction. Thus we have found that by maintaining a condition of relatively low temperature in the combustion chamber, considerable tarry matter is produced. As the temperature is increased, by increasing the suction in the combustion chamber, the amount of tarry matter is decreased and some lamp black may be produced, and at the same time the amount of gas produced is increased. At a certain temperature, which may be termed the critical temperature of the process, the amount of gas produced is a maximum, small amounts of tarry matter or of lamp black or both being produced at the same time, and if the process is being utilized for gas making only, it will be carried on, as nearly as may be, at this temperature. On further increasing the suction, with corresponding rise of temperature, the amount of lamp black is increased, the tarry matter and the illuminants being broken up into gas and lamp black, and if the process is being utilized for lamp black production it will be carried on at this high temperature. In any case we have found that by means of the suctional process described, the lamp black may be produced in a substantially dry condition; that is, without admixture of tar so that it is in condition for recovery and utilization as a commercial product.

The accompanying drawings illustrate an apparatus suitable for carrying out the process.

Figure 1 is a plan of the apparatus partly in section. Fig. 2 is a vertical section of the apparatus. Fig. 3 is a vertical section on the line $x^3$—$x^3$ Fig. 2. Fig. 4 is a horizontal section on the line $x^4$—$x^4$ Fig. 2. Fig. 5 is an elevation of the apparatus, showing a complete power system, using the produced gas.

The apparatus comprises a retort or generator chamber 1, a means 2 for separating the dry lamp black, a scrubber 3, and an exhauster 4, these several parts being connected in continuous series by suitable piping. The retort or generator chamber 1 is made of suitable refractory material and has an inlet 5 at which is placed a burner or oil atomizing device 6. An oil pump 7 is supplied with oil from an oil supply pipe 8 and forces the same through a heating means 9 to the burner 6, a valve 10 being provided to control the supply. The air supplied for combustion may also be preheated by passing through a heated drum or chamber 12 before passing to the air box 13 which delivers it to the inlet 5 aforesaid. Means 14 are provided for controlling the supply of air. From the upper part of the generator chamber 1 extends a stack or outlet pipe 16 and a delivery pipe 17 extends horizontally from said stack to the cooler. From the delivery pipe 17 a purge pipe or stack 18 extends vertically and is provided with a valve or shut-off 19 having a counter-weight 21 to hold it in either open or closed position.

The purpose of the cooler 2 is to provide a cool surface on which the lamp black or free carbon will be deposited. For convenience in cleaning or clearing, this cooler is preferably made in duplicate, comprising two or more vertical pipes 20 connected at their upper ends by a horizontal cross pipe 20' with the delivery pipe 17 from the generator, a valve 26 being provided to direct the flow to either pipe 20. The lower ends of said pipes 20 extend respectively into hoppers or receptacles 22, slide valves or cut-offs 23 being provided whereby either one of said pipes 20 can be closed or cut off from communication with the corresponding hopper, and slide valves or cut-offs 24 being provided at the bottom of each hopper to enable the bottom of the hopper to be closed or to be opened for allowing the contents thereof to discharge into the lamp black receptacle 25 which is shown as mounted on a truck for convenience in transportation. While any suitable means may be used for cooling the pipes 20 we have provided for the purpose of utilizing a portion of the waste heat of the produced gases an oil drum or chamber 9 surrounding the upper part of said pipes 20 and communicating with the oil pump 7 and the oil burner 6 to heat the oil in its passage from the pump to burner. Additional cooling means is shown consisting of a water drum 27 surrounding the lower parts of the pipes 20 and provided with water inlet and outlet pipes 28, 29. Lamp black will be deposited in greater or less measure throughout the pipes 20 and the communicating means leading thereto and in order to dislodge the lamp black and remove the same from the pipes, cleaning means are provided, consisting of spiral blade cleaners 31 mounted on stems 32 sliding through boxes 33 at the upper ends of the pipes 20, at both ends of the cross pipe 20' and at one or both ends of the delivery pipe 17.

The gas is delivered from the lower portion of the pipes 20 by a Y-connection 34, see Fig. 4, having a valve 35 to direct the flow of gas from one or the other of the pipes 20 to the outlet pipe 36 leading to the scrubber 3. Said scrubber may be of any suitable construction, comprising, for example, means 38 for injecting a spray of water into the scrubber chamber 3, the gas delivery pipe 36 extending into the lower part of said chamber, and gas outlet pipe 40 extending from the upper part of said chamber to scrubber 41. From the lower part of the chamber 3 a pipe 42 leads into a conduit 43 filled with water and communicating with the chamber 3 so that the water supply to said chamber will flow off through this conduit to a sump 50 carrying with it the carbon black deposited in the chamber 3.

The supplementary scrubber 41 may consist of a casing or chamber provided with two, preferably horizontal, partitions 45 between which is contained a mass 45' of divided water-proof material, for example, zinc shavings, mineral wool, or the like, a water supply connection 46 being provided to the upper part of the casing 41, and an outlet 48 being provided from the lower part of said casing into a run-off sluice 49. The two sluice ways 43, 49 are continued, respectively, to sumps 50, 51 wherein the lamp black collects and can be skimmed off from time to time.

The exhauster 4 may be of any suitable type and is adapted to draw the gaseous products from the delivery pipe of the generator system and force it to any suitable holder or directly to an engine or any other consumption means as may be desired, it being understood that the exhauster has sufficient capacity to maintain a condition of suction through the entire generating and scrubbing system. The retort chamber 1 is provided with suitable man hole, to enable access to the chamber, for example in starting combustion therein. For this purpose combustibles are introduced through the man hole and are ignited to bring the retort chamber to a high temperature.

The operation is as follows: The retort chamber 1 is first brought to a high temperature by starting combustion therein, the purge valve 19 being at this time open. Oil and air are then admitted at burner 6 and inlet 5, exhauster 4 is set in operation and purge valve 19 is closed so that the exhauster draws air through the inlet 5. Oil pump 7 furnishes the oil under sufficient pressure to cause the same to be atomized and discharged in a divided jet in the furnace chamber and after the operation is fully under way this effect is increased by the fact that the oil is heated in the means 9 so as to present considerable elastic pressure causing its sudden expansion when discharged from the burner. The air supply is so controlled by the means 14 that the amount of air passing into the chamber 1 under the suction produced by the exhauster is sufficient only to support combustion of a portion of the hydrocarbon oil supplied through the burner 6 so that the major portion of the oil is unconsumed and passes up through the delivery pipe 16 as a combustible gas, a portion of the carbon of the oil being at the same time set free and passing through the said pipe along with the gas. The manner in which the decomposition of the oil proceeds and the relative amount of gas and carbon black produced depends on the temperature at which the operation is carried on, and this, in turn, depends on the degree of suction produced by the exhauster. For a given amount of suction or rate of operation of the exhauster 4 increase of the oil supply results in lowering the temperature and in fact it is possible to carry this to such an extent that considerable tarry matter will be produced. On the other hand, if the oil supply is maintained constant and the rate of operation, or the suction, of the exhauster 4 is increased with resultant increase in the amount of air passing into the chamber by reason of the increased difference of pressure in the outside atmospheric air and the interior of the chamber, the temperature of the chamber rises and in that case substantially no tarry matter is produced and the carbon black is set free in a substantially dry condition. As the temperature rises it is found that the gas produced is lighter in character, being relatively free from illuminating gases and there is a corresponding increase in the amount of lamp black, the illuminating gases having been broken up into thinner gases and free carbon. The manner in which the process is carried on will therefore depend on the products most desired, that is to say, whether the plant is operated primarily as a gas making plant or as a carbon black plant, or as a combination of the two. As the lamp black passes over, as stated, in substantially dry condition, it is possible to save the same, or the major portion thereof, in a dry separator such as shown at 2, the lamp black being deposited on the cool surface of the pipes 20 and being removed therefrom from time to time by the scrapers or cleaners 31 which are pushed along the pipe and turned to dislodge the carbon black and cause it to fall in the pipes 20 and into the hoppers 22. The pipes 20 are used alternately, the valve 35 in the Y-connection being turned to direct the flow from one or the other of said pipes and the valve 26 at the top of the pipes being similarly operated to direct the flow from the retort into the pipe 20 which is being used for the time being. When either pipe 20 is thus cut off the carbon black may be cleared therefrom as above stated, the slide valve 23 at the bottom of said pipe being open to enable the carbon black to fall into the hopper 22 and then after closing said slide valve the lamp black may be removed from the valve to the hopper by opening valve 24. Such of the carbon black as is not deposited in the dry separator 2 passes along with the gas into the scrubber 3 where nearly all of it is washed from the gas by means of the jet of water and is carried away in the sluice way 43 to sump 50. A small proportion of the carbon black is not separated from the gas by the action of the spray and this portion will be taken up in the supplementary scrubber 41, the carbon black adhering to the wet surface of the zinc shavings, etc. and being washed therefrom by the water supplied at the top of the casing 41 and being carried away by the sluice way 49 into the sump 51.

It will be seen that the carbon black is separated from the gas in three different stages and in general the three different sets of carbon black so separated will be of different quality or grade and will be adapted for different uses.

The above described gas generator is especially adapted for use in a power plant, as shown in Fig. 5, the gas engine, indicated at 54, serving in that case, as the exhauster for the system and the generator furnishing the gas for the engine. In such a plant it is desirable to provide for automatic regulation of the oil and air supply in correspondence with the demands of the engine so that the proper condition of suction may be maintained in the retort, as the correct operation according to the principles above set forth, depends on the maintenance of a definite condition of suction. For this purpose, the governor 55 of the gas engine is connected by connections 56, 57, 58, 59, with the fuel supply valve 60' and the air supply damper 14.

What we claim is:

1. The process of producing carbon black together with combustible gas, which consists in producing a condition of suction in a combustion chamber, continuously supplying petroleum to said chamber, admitting a restricted quantity of air to said chamber to cause partial combustion of the petroleum, the condition of suction in the chamber being such that the resulting temperature is sufficiently high to substantially break up the tarry matter and to cause the unconsumed petroleum to be decomposed substantially into combustible gas and free carbon, drawing off the combustible gas to maintain the condition of suction in the combustion chamber, and delivering such combustible gas.

2. The process of producing carbon black together with combustible gas, which consists in producing a condition of suction in a combustion chamber, continuously supplying petroleum to said chamber, admitting a restricted quantity of air to said chamber to cause partial combustion of the petroleum, the condition of suction in the chamber being such that the resulting temperature is sufficiently high to substantially break up the tarry matter and to cause the unconsumed petroleum to be decomposed substantially into combustible gas and free carbon, drawing off the combustible gas to maintain the condition of suction in the combustible chamber, and delivering such combustible gas, the petroleum being supplied to the chamber and atomized under its own expansive pressure.

3. The process of producing carbon black together with combustible gas, which consists in producing a condition of suction in a combustion chamber, continuously supplying petroleum to said chamber, admitting a restricted quantity of air to said chamber to cause partial combustion of the petroleum, the condition of suction in the chamber being such that the resulting temperature is sufficiently high to substantially break up the tarry matter and to cause the unconsumed petroleum to be decomposed substantially into combustible gas and free carbon, drawing off the combustible gas to maintain the condition of suction in the combustion chamber, and delivering such combustible gas, exposing the gas to the action of a cooling surface to separate carbon black therefrom, and removing the carbon black from such cooling surface.

4. The process of producing carbon black together with combustible gas, which consists in producing a condition of suction in a combustion chamber, continuously supplying petroleum to said chamber, admitting a restricted quantity of air to said chamber to cause partial combustion of the petroleum, the condition of suction in the chamber being such that the resulting temperature is sufficiently high to substantially break up the tarry matter and to cause the unconsumed petroleum to be decomposed substantially into combustible gas and free carbon, drawing off the combustible gas to maintain the condition of suction in the combustion chamber, and delivering such combustible gas, exposing the gas to the action of a cooling surface to separate carbon black therefrom, and removing the carbon black from such cooling surface, and subsequently subjecting the gas to the action of water to separate an additional portion of carbon black therefrom.

5. The process of making a carbon black which consists in effecting partial combustion of petroleum at sufficient temperature to decompose the tarry matter and to produce hot gases containing free carbon, and applying water to the gases to reduce the temperature thereof and to separate the carbon in the form of finely divided carbon black.

In testimony whereof, we have hereunto set our hands at Los Angeles, California, this 17th day of March 1909.

WARREN H. FROST.
JOSHUA J. NIX.

In presence of—
ARTHUR P. KNIGHT,
FRANK L. A. GRAHAM.